H. GERDIEN.
ARRANGEMENT FOR EVACUATING GASES FROM VESSELS.
APPLICATION FILED OCT. 6, 1915.

1,335,829. Patented Apr. 6, 1920.

UNITED STATES PATENT OFFICE.

HANS GERDIEN, OF BERLIN-SCHMARGENDORF, GERMANY, ASSIGNOR TO SIEMENS & HALSKE AKTIENGESELLSCHAFT, OF BERLIN, GERMANY, A CORPORATION OF GERMANY.

ARRANGEMENT FOR EVACUATING GASES FROM VESSELS.

1,335,829.      Specification of Letters Patent.      Patented Apr. 6, 1920.

Application filed October 6, 1915. Serial No. 54,473.

*To all whom it may concern:*

Be it known that I, HANS GERDIEN, a citizen of the German Empire, and resident of Berlin-Schmargendorf, Germany, have invented certain new and useful Improvements in Arrangements for Evacuating Gases from Vessels, of which the following is a specification.

The present invention relates to an arrangement by means of which gas may be removed from a container, or the gas pressure within the latter may be reduced without employing any mechanical means, such as pumping devices or the like containing moving parts. The essential feature of the present invention lies in the fact that thermal motion is directly converted into a flowing motion of the gas. In particular the "blast" or propelling action of heated surfaces is employed for the purpose of the present invention. In the following the manner in which such action is utilized is more fully described.

In the accompanying drawings,—

Figure 1:
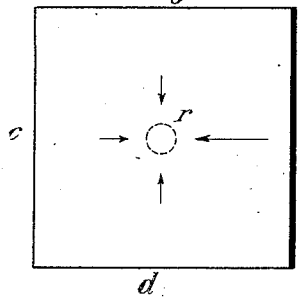
Figure 1 is an explanatory diagram.

When the molecules of a gas have in a given portion of space the same mean velocity in all directions, the said gas will appear immovable in the said portion of space, and the kinetic energy of the gas molecules will manifest itself as heat. When, however, in such portion of space the gas molecules have, in one direction a higher mean velocity than in other directions, the gas will in said space portion have a flowing motion in a direction corresponding to the excess in velocity. When, now, a space is filled with a stationary gas of an even temperature, and inclosed on all sides by walls, gas molecules will be continuously impinging against such walls and, in the same manner, gas molecules will be continuously repelled in all directions by the said walls. The mean velocity of the molecules repelled by the walls depends on the temperature of these walls. If this temperature is equal to that of the gas, the mean velocity of the repulsed molecules and that of the impinging molecules, respectively, will be the same. If, however, the temperature of the wall is higher than that of the gas, the mean velocity of the molecules repulsed by such wall will be greater than the velocity of the impinging molecules. Given a space, inclosed by the walls $a, b, c, d,$ (seen Fig. 1) of which walls the wall $a$ shall have a higher temperature than the other walls, it will be found, on considering the behavior of the molecules in a portion of space $r$ within said walls, under the assumption that the molecules repelled toward this portion of space can uninterruptedly continue their course, that the molecules will enter into this space portion at a higher velocity, when proceeding from the wall $a$, than when proceeding from the walls $b, c$ or $d$. The gas contained in the said space portion $r$ will, therefore, receive a motion in the direction away from the wall $a$ corresponding to the mean excess in the respective velocities of the molecules. The same applies to all space portions which are in an analogous manner, under the influence of the wall $a$. The difference in the temperature or in the heating of the wall $a$, thus results in a motion of the gas away from the wall $a$, and, if a suitable opening is provided in the opposite wall $c$, the gas will emerge through such opening, and can there even overcome a counter-pressure, the degree of which will depend on the velocity of the flowing gas.

Such action of the heated wall will, of course, be the greater the higher the temperature of the said wall over the temperature of the opposite wall. Furthermore the action will depend on the pressure of the gas.

Hereinbefore it has been assumed that the travel of the gas molecules throughout the whole space is not obstructed. The greater the number of gas molecules within the gas space, the smaller will be the distance which the gas molecules will actually be able to travel. Therefore, the current producing effect of a heated wall on a given part of the gas space will depend on the number of gas molecules contained in such space, in other words on the pressure of the gas in the said space. The effect will increase with the drop in pressure and will approach a most favorable value, when the pressure is so low that the free travel of all molecules corresponds to the order of the dimensions of the respective vessel. In vessels of the dimensional order of one centimeter, for example, a distinct "blast effect" will be obtained by a heated wall at a pressure of one hundredth centimeter mercury column. Under otherwise equal conditions the blast effect will rise to a pressure of about 1/10,000 or 1/100,000 c. m. Below this pressure the effect will become almost constant. On the other hand, the effect will rise at any pressure at the ratio between the temperature of the heated wall and the temperature of the opposite wall portions.

The hereinbefore described thermal blast effect of the heated wall of a vessel is, now, utilized according to the present invention for removing gas from vessels.

The arrangements employed for the purpose stated may be of varied design. Common to all is a surface, heated to a higher temperature than the others, and acting as "blower." This surface of a higher temperature is disposed in an auxiliary vessel, which is brought into communication with the space to be evacuated. The outlet from the said auxiliary vessel is arranged approximately in the direction of the main blast from the said surface. The communicating opening leading into the space to be evacuated must be so arranged that with regard to its position or its shape, it is less subject to the action of the "blower" than the outlet.

Figure 2:
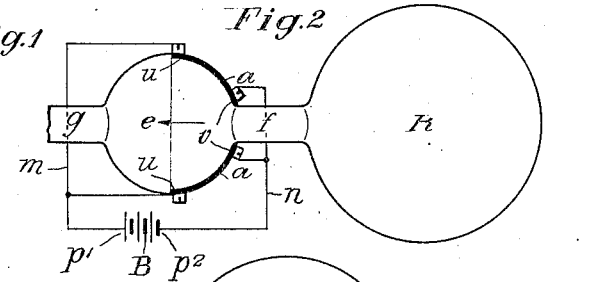
Fig. 2 shows a single evacuating device, according to my invention.

Under consideration of these general rules any arrangements such as exemplified in the drawings may be employed. In Fig. 2, R is the vessel to be evacuated, $e$ is a spherical vessel which communicates by means of a tube $f$ with the vessel R and by means of a second tube $g$ with another vessel (for example a previously evacuated vessel), into which the gas, evacuated from vessel R may flow. The wall portions are heated to a temperature, which is higher than that of the other walls of the vessel $e$, and are so disposed that the blast produced by them is essentially directed toward the outlet $g$. The result is that a current of gas in the direction indicated by the arrow is produced.

It is immaterial in which manner the portion $a$ of the vessel or sphere $e$ is heated. In Fig. 2, a form of heating is shown as an example in which the heating is effected by an electric current. In this modification the wall $a$ of sphere $e$ consists on the inside of suitable thin sheet metal. Along the outer edge of the metal sheet are distributed uniformly a number of binding posts $u$ which are connected by the conductors $m$ with the pole $p^1$ of a battery B. Along the inner edge of the metal sheet adjacent to the connecting tube $f$ are uniformly distributed the binding posts $v$ which are connected by the conductors $n$ with the pole $p^2$ of battery B. Thus, the current passes through the metal sheet, heating it to the desired degree.

Figure 3:
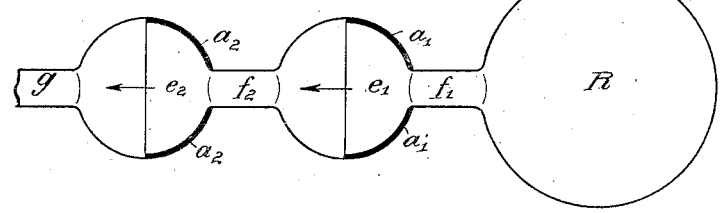
Figs. 3, 4, 6 and 7 show how a plurality of evacuating devices may be arranged in series.

If, in place of one single sphere $e$, several such spheres $e_1$, $e_2$ . . . are employed, communicating in series, as shown in Fig. 3, the blast effect will be increased: this will be the case to such an extent that, at a very low pressure, the rule will approximately apply that the diminution of pressure produced by $n$ single elements communicating in series will be equal to the $n$th power of the diminution of pressure produced by one single element.

Instead of heating the walls directly, special heated surfaces may, obviously, also be arranged in proximity of the respective walls. Furthermore, for the purpose of maintaining the difference in temperature, the wall surfaces which shall not be heated, may, on the contrary, be cooled.

With regard to the effect to be obtained, it is immaterial what method of heating and of cooling respectively, is employed. So, for example, hollow heaters and coolers may be employed through which a heating or cooling medium, respectively, flows. The surfaces may, also, be electrically heated; furthermore blackened surfaces may be employed, onto which a source of heat throws its heat rays. This latter method allows particularly simple arrangements.

The cooling may be effected by means of webs or other means employed in the art.

Figure 4:
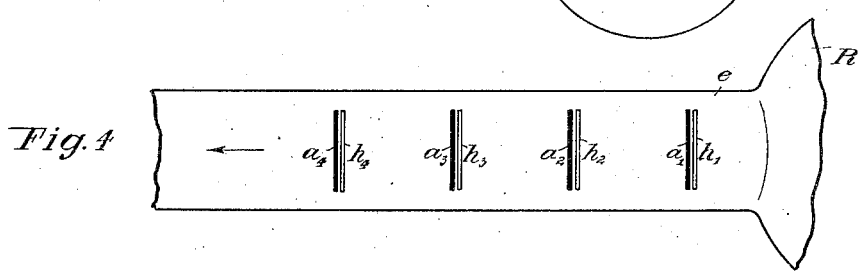

Arrangements of the character shown in Fig. 4 allow of very simple constructions. In the tubular vessel $e$, which communicates with the space R to be evacuated, are disposed the heated planes $a_1$, $a_2$, $a_3$, $a_4$. If the temperature were the same on both sides of these planes, they would exert a blast effect both away from space R and also toward space R. If, however, the rear sides of said heated planes are covered with cooled planes $h_1$, $h_2$, $h_3$, $h_4$, the blast effect in the direction away from the space R will prevail, and a current will be produced in the direction indicated by the arrow. It may, under certain circumstances, also suffice, for insuring the blast effect on one side only, to provide on the rear side of the heated planes a heat insulation only, instead of the cooled surfaces $h$.

Figure 5:
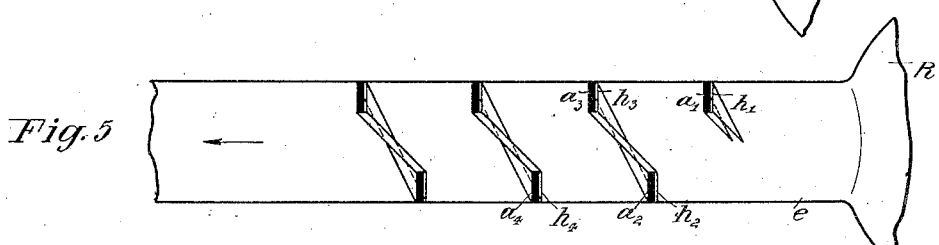
Fig. 5 shows how the evacuating device may be arranged in a continuous spiral in the evacuating vessel.

Instead of disposing the heated surfaces in a single line, they might also be arranged in a helical line within a tube, as indicated in Fig. 5, where $a_1$, $a_2$, $a_3$, $a_4$ are sections through the helical heated body, and correspondingly, $h_1$, $h_2$, $h_3$, $h_4$ the coolers or heat insulators forming a backing to the same toward the space R.

Figure 6:
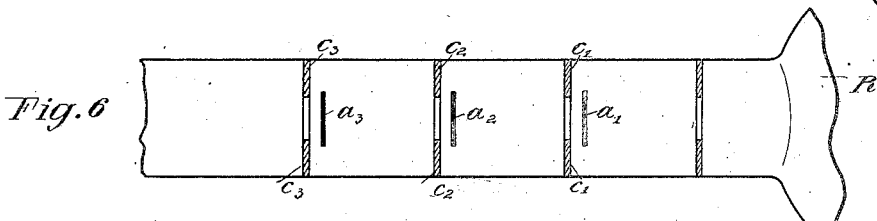
Figure 7:
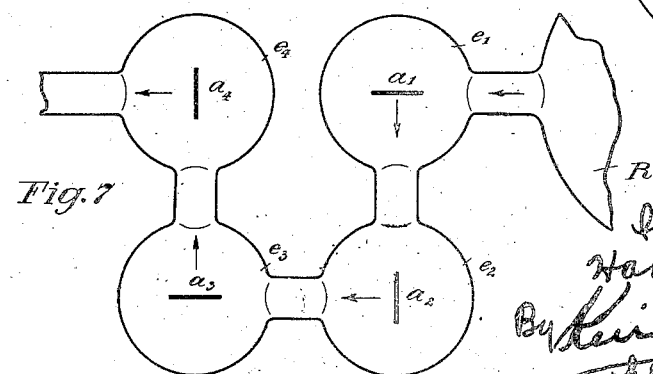

In the other figures, for instance Figs. 6 and 7, in which heat insulating or cooling surfaces are not specifically illlustrated, it is assumed that they may or may not be employed as the expediency may require. These figures are intended merely to show the general arrangement of a plurality of evacuating devices.

Fig. 6 exemplifies an arrangement, in which a blast effect in one direction only may also be secured in a tube having constrictions or partitions $c_1$ $c_2$, $c_3$, $c_4$, if the heated planes $a_1$, $a_2$, $a_3$ are disposed close to an opening formed by such constrictions or the like. The blast effect of the heated planes on the nearest opening will then be stronger than on the more distant opening, and a current in the direction of the arrow will be secured even if the rear surfaces of the planes $a$ are not covered with cooled surfaces or heat insulators.

For similar reasons a blast effect is also obtained with the arrangement according to Fig. 7, in which flat, heated disks $a_1$, $a_2$, $a_3$, $a_4$ are so arranged in vessels $e_1$, $e_2$, $e_3$, $e_4$, that they present a large surface to the opening leading into the preliminarily evacuated space, and their narrow edge only to the opening leading into the space R to be evacuated. Also in this case a current to one side in the direction of the arrow will be secured. The heated planes are made of material suitable for the gases in which they are used. In the present case, I have assumed bare metal plates. It is, however, within the province of those skilled in the art to use other material if required.

The high efficiency of arrangements constructed according to the present invention opens a wide and important range of applications; they are, in particular, applicable for producing a very high vacuum in the construction of Röntgen apparatus, in the manufacture of electric incandescent lamps and the like. They may, furthermore, be employed for subsequently regulating the vacuum in a Röntgen tube or rectifiers, by placing such an arrangement between the Röntgen tube or the rectifier and an auxiliary vessel. By controlling the temperature of the thermal blast surface it will then be possible to vary, for example, the degree of hardness of the Röntgen tube, or in case of rectifiers, to always again restore the original vacuum.

As the effect of the arrangement essentially depends on the pressure, in particular in so far as it will assume a favorable value at a certain pressure only, it will be preferable to reduce by means of some other suitable device for example a mechanical pneumatic pump, the pressure in the vessel to be evacuated down to a favorable degree, and then only to start the thermal blast. Even after this thermal blast has been started, the mechanical pump will, in many instances be employed to continuously maintain the preliminary evacuation to a degree necessary for insuring a good effect.

As the capacities of arrangements obtained under otherwise equal conditions also depend on the dimensions of such arrangements, and these may not be simply increased so as to correspondingly raise the effect, it might, in certain cases be advisable to connect a plurality of small arrangements parallel to each other, so as to thereby increase the total capacity. This will particularly come into question, when large vessels are to be evacuated.

Having thus described my invention I claim as new and desire to secure by Letters Patent of the United States:—

1. In an evacuating device in combination a container, an exhaust opening in said container, means for connecting said container to the space to be evacuated and at least one surface in said container adapted, when hot, to project molecules of gas from said container through said exhaust opening.

2. In an evacuating device in combination a container, an exhaust opening in said container, means for connecting said container to the space to be evacuated and at least one surface in said container located in such a position relatively to said exhaust opening, that the molecules of gas projected from said surface, when it is hot, will pass through said opening.

3. In an evacuating device in combination a container, an exhaust opening in said container, means for connecting said container to the space to be evacuated, at least one surface in said container adapted, when hot, to project molecules of gas from said container through said exhaust opening and means for preventing said surface from projecting molecules of gas in an opposite direction.

4. In an evacuating device in combination a container, an exhaust opening in said container, means for connecting said container to the space to be evacuated, at least one surface in said container adapted, when hot, to project molecules of gas from said container through said exhaust opening, and means for heating said surface.

5. In an evacuating device in combination a plurality of containers in communication with each other, an exhaust opening in each container, means for connecting the first container to the space to be evacuated and at least one surface in each container adapted, when hot, to project molecules of gas through the exhaust opening.

HANS GERDIEN.